United States Patent

[11] 3,619,335

| [72] | Inventor | Thomas Toplica Bryan |
| | | White Bear Lake, Minn. |
| [21] | Appl. No. | 818,046 |
| [22] | Filed | Apr. 21, 1969 |
| [45] | Patented | Nov. 9, 1971 |
| [73] | Assignee | Minnesota Mining and Manufacturing Company |
| | | St. Paul, Minn. |

[54] UNITARY LAMINATE
15 Claims, No Drawings

[52] U.S. Cl. .................................................. 161/1,
117/3.1, 117/35.5, 117/138.8, 161/231, 161/244,
161/254, 161/406, 260/18, 260/33.2 R, 260/45.95
[51] Int. Cl. ..................................................... B32b 7/06,
B32b 27/06
[50] Field of Search ........................................... 161/1, 231,
249, 254, 406; 117/3.1, 35.5, 138.8 F; 260/33.2,
45.95; 101/128.2, 128.3

[56] References Cited
UNITED STATES PATENTS
3,425,979  2/1969  Monaghan et al. ........... 260/33.2
FOREIGN PATENTS
820,541  9/1959  Great Britain
1,152,539  8/1963  Germany

*Primary Examiner*—John T. Goolkasian
*Assistant Examiner*—Lorrain T. Kendell
*Attorney*—Kinney, Alexander, Sell, Steldt and Delahunt ABSTRACT: A unitary laminate is shown comprising a backing layer and flexible polymeric film. The film includes as a plasticizer a nonionic surfactant. In a preferred embodiment, the flexible polymeric film is adhered to the backing layer by an intermediate adhesive layer.

UNITARY LAMINATE

Laminates having a removable, flexible polymeric film constituent are known to the art, and have been used extensively in photographic and silk screen processes. One such laminate has been described in U.S. Pat. No. 2,576,491 (Ulano, issued Nov. 27, 1951). Such laminates have contained a backing layer, such as paper, polyester film, and the like, and a normally flexible, dye-containing polymeric film such as plasticized nitrocellulose. The polymeric film has commonly been plasticized with such common plasticizers as dioctylphthalate, dibutylphthalate, castor oil, tricresyl phosphate, and the like. Many of such laminates further contain an adhesive layer adhering the polymeric film to the backing layer such that when a portion of the polymeric film is removed from the laminate, the adhesive layer remains adhered to the polymeric film, thereby permitting the removed portion of this film to be adhered to any suitable substrate.

With time, however, the plasticizers contained in the flexible polymeric film of the above-described laminates have often been observed to migrate or "bleed" to the surfaces of the film, rendering these surfaces somewhat "oily." The surface characteristics of the flexible film often are not uniform; e.g., the film surface is often dry in one area and oily in an adjacent area. As a result, the oily exposed surface of the flexible film has been observed to pick up fingerprints and dirt during normal handling, and in addition has contributed to the tendency of such laminates to "block"; e.g., to stick together, when stored in roll or stack form. In addition, such plasticizers have been observed to carry dyes which are incorporated within the flexible polymeric film to the surfaces of the film where they are easily rubbed off by normal handling. In those laminates employing an intermediate adhesive layer, the oily nature of the interface between the adhesive layer and the flexible polymeric film reduced the adhesion therebetween such that when a portion of the polymeric film is stripped from the backing layer, the adhesive layer or a portion thereof remains adhered to the backing layer rather than being carried with the flexible film as desired.

It has further been observed that a static electrical charge is often generated when the flexible polymeric film of an above-described laminate is stripped away. The static charge causes the removed portions of the flexible polymeric film to curl and twist and renders normal handling of such removed portions of film very difficult.

The present invention provides a unitary laminate which avoids the above-mentioned problems. Briefly, the laminate of the present invention comprises a backing layer and a flexible polymeric film which is carried by the backing layer and which is dry-strippable therefrom. The flexible polymeric film comprises a plasticizable polymer, a separate radiation-absorber, and a plasticizer compatible with the polymer, a major portion of which plasticizer by weight consists essentially of a nonionic surfactant having in its hydrophilic moiety at least four consecutive, recurring oxyethylene units. In a preferred embodiment, the so-described flexible polymeric film is strippingly adhered to the backing layer by an adhesive layer which has greater internal cohesive strength than adhesive strength to the backing layer and which has sufficient adhesion to the flexible polymeric film to adhere thereto when the polymeric film is stripped from the backing layer.

The so-described nonionic surfactant serves not only as a plasticizer but also as an antistatic agent to rapidly dissipate any static electrical charge which may be generated when the polymeric film is stripped from the backing layer, thereby permitting the removed portions of the polymeric film to hand limp and to be easily handled without curling or deforming. Further, by employment of nonionic surfactants as plasticizers in the laminates of the present invention, the above-described problems associated with the migratory, commonly used plasticizers which bleed to the surfaces of the polymeric films are avoided. It has been found that the surfaces of the flexible polymeric films of the present invention remain dry and are readily adherent to an adhesive layer.

The surfactant properties of nonionic surfactant compounds are believed to be derived from the fact that one portion of a nonionic surfactant molecule is normally hydrophilic and another portion of the molecule is hydrophobic. The nonionic surfactants which are employed in the present invention may be considered as reaction products of ethylene oxide with a hydrophobic compound which has at least one active hydrogen atom. The resulting nonionic surfactant molecules thus have a hydrophilic moiety which is derived from ethylene oxide and a hydrophobic moiety which is derived from the hydrophobic compound. The antistatic properties of such surfactants are believed to be derived from the fact that small quantities of water are affixed by hydrogen bonding to the ether oxygen atoms of the hydrophilic moiety of the surfactant molecule which render the molecule at least partially conductive. Valuable antistatic properties are exhibited by those nonionic surfactants wherein the hydrophilic moiety includes at least 4 and preferably 8–12 consecutive, recurring oxyethylene units.

The preferred nonionic surfactants which are used in the present invention may be represented by the formula:

$$R \text{---} \left[ \left( C_2H_4O \right)_m \text{---} H \right]_p$$

wherein $m$ is an integer greater than 3, $p$ is 1 or 2, and R is a p-valent derivative of a hydrophobic compound having at least one active hydrogen atom. R, for example, may be a derivative of an alkyl phenol, a fatty acid, a fatty alcohol, a fatty mercaptan, a fatty amine, a fatty amide, a fatty polyol, etc. Especially preferred nonionic surfactants are those wherein R is aromatic, since the employment of such surfactants in the concentrations provided for herein provide valuable U.V. light-absorbing properties for the flexible films in which they are incorporated.

Examples of several of the various "R" groups and the corresponding commercial surfactants useful in the present invention are given in table I below.

TABLE 1

| Type | Hydrophobic compound | Resulting non-ionic surfactant | Trade name |
|---|---|---|---|
| 1. Alkylphenoxypoly(ethyleneoxy)ethanol. | $C_9H_{19}$—⟨phenyl⟩—OH | $C_9H_{19}$—⟨phenyl⟩—O—$(C_2H_4O)_m$—H | Igepal CO-630 (A trademarked product of General Aniline Film Corporation). |
| 2. Polyoxyethylene alcohols. | $(CH_3)_2(CH_2)_nOH$ | $(CH_3)_2$—$(CH_2)_n$—O—$(C_2H_4O)_m$—H | Tergitol 15-S-19 (A trademarked product of Union Carbide Chem. Company). |
| 3. Polyoxyethylene esters of fatty acids. | $C_nH_{2n+1}$—COOH | $C_nH_{2n+1}COO$—$(C_2H_4O)_m$—H | Emulphor VN-430 (A trademarked product of General Aniline and Film Corporation). |
| 4. Polyoxyethylene mercaptans. | $C_{12}H_{25}$—SH | $C_{12}H_{25}$—S—$(C_2H_4O)_m$—H | Nonic 218 (A trademarked product of Pennsalt Chemicals Corporation). |
| 5. Polyoxyethylene alkylamines. | $\begin{cases} C_nH_{2n+1}NH_2 \\ (C_nH_{2n+1})_2NH \end{cases}$ | $C_nH_{2n+1}N\begin{matrix}(C_2H_4O)_x\text{—H} \\ (C_2H_4O)_y\text{—H}\end{matrix}$  <br> $(C_nH_{2n+1})_2N$—$(C_2H_4O)_m$—H | Ethomeen C/20 (A trademarked product of Armour Industrial Chemical Company). |

6. Polyoxyethylene alkylamides... $C_nH_{2n+1}CONH_2$

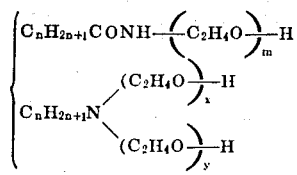

Alcosol CS (A trademarked product of Geigy Chemical Corporation).

Preparation of the nonionic surfactant compounds which are employed in the present invention have been described in numerous publications and hence need not be described in detail here. See, for example, M. J. Schlick, Ed., Nonionic Surfactants, Vol. 1, Marcel Dekker, Inc., New York, N.Y., 1967.

As used herein, "nonionic surfactant" refers not only to single nonionic surfactant species but also to combinations of nonionic surfactants. It is required that the nonionic surfactants employed in the present invention be compatible with the polymer employed. A high degree of compatibility has been observed between the described polymers and surfactants, with one minor exception: when cellulose acetate butyrate is employed as the major polymer constituent in the flexible polymeric film, generally poor compatibility and plasticization are obtained when a nonionic surfactant plasticizer having polyoxypropylene groups in its hydrophobic moiety is employed. Consequently, a nonionic surfactant having polyoxyalkylene groups solely in its hydrophilic moiety is employed as a plasticizer for cellulose acetate butyrate.

"Compatibility" as used herein refers to the ability of a nonionic surfactant to plasticize a polymer without causing undue haziness or cloudiness may be tolerated provided that the plasticized polymer remains at least translucent. Compatibility is achieved if a 0.0015 inch thick film of plasticized polymer is visually translucent under normal indoor lighting.

The flexible polymeric film of the subject laminates which includes an above-described nonionic surfactant may be of any plasticizable polymer, such as cellulose acetate butyrate, cellulose nitrate, polyvinylbutyrate, polyvinylalcohol, poly methylmethacrylate/ethylmethacrylate copolymer, poly methylmethacrylate/n-butylmethacrylate copolymer, cellulose propionate, etc., or mixtures thereof. Such polymers are preferably thermoplastic and solvent soluble. Cellulose acetate butyrate is especially preferred as at least the major polymeric constituent by weight because of the exceptionally strong and supple polymeric films obtainable therefrom. The flexible polymeric films of the present invention are "dry strippable"; that is, they may be stripped when dry from the backing layer without requiring loosening by solvent-soaking or the like.

"Plasticizable" refers to polymers into which plasticizers (e.g., dibutylphthalate, etc.) may be incorporated to increase flexibility. As will be apparent from the instant disclosure, "plasticizable polymer" as used herein refers not only to single polymer species but also to combinations of polymers, for example cellulose acetate butyrate polymer combined with polymethylmethacrylate/ethyl methacrylate copolymer, etc.

The quantity of plasticizer to be incorporated in the polymeric film is, of course, dependent upon the desired degree of flexibility. In general, the degree of flexibility increases as the concentration of plasticizer is increased. To obtain a flexible polymeric film with reasonably good strength, about 5 to about 60 percent by weight (based upon the flexible polymeric film) is commonly required. The preferred concentration of plasticizer is from about 20 to about 30 percent by weight.

As mentioned above, a major portion (i.e., at least half) of the plasticizer by weight must consist of at least one nonionic surfactant. Experimentation has shown that poor antistatic properties result if less than this amount of surfactant is employed. For example, in one experiment a polymer solution was prepared having the following composition:

| | |
|---|---|
| Cellulose acetate butyrate | 132.5 g. |
| Acrylic Polymer B–72 (Rohm and Haas Co.) | 32.0 g. |
| Ethyl acetate | 185 g. |
| Isobutyl alcohol | 280 g. |
| Ethyl alcohol | 535 g. |
| Toluene | 120 g. |
| Du Pont oil red (E. I. Du Pont de Nemours & Co., Inc.) (dye) | 1.0 g. |
| Acetosol Brown GLS (Sandoz, Inc.) (dye) | 0.5 g |
| Acetosol Orange RLS (Sandoz, Inc.) (dye) | 5.4 g. |

The solution was divided into four portions, and to each portion was added a quantity of plasticizer such that a dry film which was coated from the solution contained 22 percent by weight of plasticizer. Igepal CO–630 (nonylphenoxypoly(ethyleneoxy)ethanol). General Aniline and Film Corp., dibutyl phthalate, and mixtures thereof were employed as plasticizers. The solutions were cast into films on polyethylene terephthalate backing sheets and dried. Thereafter the dry films were stripped from the backing sheets, and the static charge which remained on each film after 30 seconds was measured. The results are reported in the following Table II.

TABLE II

| Plasticizer | Static Charge, volts |
|---|---|
| A. Nonylphenoxypoly(ethyleneoxy) ethanol | 1.7 |
| B. Nonylphenoxypoly(ethyleneoxy) ethanol/dibutylphthalate (3/1 by weight) | 1.5 |
| C. Nonylphenoxypoly(ethyleneoxy) ethanol/dibutylphthalate (1/1 by weight) | 2.1 |
| D. Dibutyl phthalate | 6.3 |

The plasticizer preferably contains at least 75 percent of surfactant. Most preferably, nonionic surfactant is employed as the sole plasticizer for the film.

The flexible polymeric films utilized in the laminates of the present invention have incorporated therein at least one of various separate radiation absorbers, e.g., absorbers of light, heat, and X-ray radiation. For example, various U.V. light-absorbing materials, and visible light absorbing materials such as the dyes shown in the examples below, may be employed to absorb light; carbon black may be employed to absorb heat and infrared light, and various metals of high atomic weight and their derivatives (e.g., lead, lead oxide, etc.) may be employed to absorb X-rays. By "separate radiation absorber," reference is made not only to single radiation absorbing materials, but also to combinations of such materials. Preferably, the U.V. and visible light absorbing materials are completely compatible with e.g., soluble in, the flexible film. When visible light absorption is desired, use is made of at least one and preferably two or more visible light absorbing materials, as shown in the examples below.

The backing layer of the subject laminates may be of any convenient substrate such as glass, coated paper, plastic film, metal foil, etc. The backing layer is preferably at least translucent and most preferably is transparent. An especially suitable backing layer is polyethylene terephthalate film. Since a sharp instrument is often employed to scribe designs into the flexible polymeric layer, it is desirable that the backing layer be of sufficient thickness and hardness to avoid being severed during the scribing operation, and preferably is harder than the flexible polymeric film.

One convenient method of preparing the unitary laminate of the present invention is as follows: a backing layer (e.g., polyethylene-terephthalate film) is coated first with an adhesive material (e.g., a natural rubber pressure-sensitive adhesive composition) and then with a solution containing a polymer, a nonionic surfactant plasticizer, and a light-absorbing dye. The coating is dried to provide a transparent laminate having three distinct layers: a backing layer, a pressure-sensitive adhesive layer, and a flexible, polymeric film containing a light-absorbing dye soluble therein. The laminate thus prepared is placed upon a graphic design to be copied, the backing layer of the laminate contacting the design. The design (e.g., a circle), which is observed through the transparent laminate is traced upon the flexible polymeric film with a sharp instrument which cuts through the film but not through the backing layer. That portion of the flexible polymeric film and adhesive layer which corresponds to the circular design is removed, as by peeling, leaving a circular, colorless "window" in the laminate remaining on the design. This laminate is then placed upon the photosensitive surface of a photographic film which is subsequently exposed to light at a wavelength which is substantially totally absorbed by the dye in the flexible polymeric film. The laminate is removed and the photographic film is developed to yield an exact reproduction of the original image. If the original design represents the actual size and shape of a part to be machined from (e.g., aluminum, the removed circular portion of the colored polymer film may be adhered by its adhesive layer to an aluminum substrate, thereby forming a machining pattern or template. If the removed portion of the flexible polymer film and adhesive layer is not to be used, however, the adhesive layer may be omitted from the laminate.

In another embodiment of a laminate of the present invention, the backing layer may be a sheet of copper of the type used in the manufacture of printed circuits, the copper sheet being firmly adhered to a rigid phenolic substrate. The copper sheet carries on its surface a flexible polymeric film of the type described above containing a colored dye and adhered to the copper sheet by an adhesive layer. A printed-circuit pattern is cut into the flexible polymeric film. Those portions of the polymeric film overlying portions of the copper sheet which are to be retained in the printed circuit are allowed to remain in contact with the copper sheet; all other portions of the polymeric film are removed, as by peeling. The precision of the cutting operation is easily observed by virtue of the difference in color between the dye-containing film and the copper backing layer. The assembly is then placed in an etching bath, and those portions of the copper sheet from which the polymeric film was removed are etched away, leaving the copper sheet intact only in those areas covered by the remaining polymeric film. Thereafter, the polymeric film which remains is peeled away from the copper substrate to provide a phenolic sheet having a precisely aligned printed circuit thereon.

The adhesive layer which may be employed in a laminate of the present invention can be any adhesive which exhibits greater internal cohesive strength than adhesive strength to the backing layer and which has sufficient adhesion to the polymeric film to remain adhered thereto when the polymeric film is stripped from the backing layer and which has sufficient adhesion to the polymeric film to remain adhered thereto when the polymeric film is stripped from the backing layer. The adhesive layer is preferably pressure-sensitive and tacky. Suitable adhesives include those disclosed in U.S. Pats. No. 2,203,677; 2,319,959; 2,567,671; and 2,884,126.

Since the laminates of the present invention may often be stored in stacks or in rolls, it is often desirable to add to the flexible polymeric film a small quantity of "antiblocking" material to prevent the laminates from sticking to one another. A number of particulate antiblocking materials such as finely divided silica, titanium dioxide, zinc oxide, lithium stearate, etc. have been successfully employed. Finely divided silica is preferred.

The present invention may be more easily understood by reference to the following illustrative examples:

EXAMPLE I

A 0.003 inch thick transparent film of polyethylene terephthalate ("Mylar", a tradmarked product of E. I. du Pont de Nemours & Company) was coated to a dry thickness of 0.0015 inches with a solution of:

| | |
|---|---|
| Cellulose acetate butyrate polymer (EAB-381-20, Eastman Kodak Co.) | 132.5 g. |
| Acrylic Polymer B-72* (Rohm and Hass Co.) | 32 g. |
| Azosol Fast Brilliant Red B (General Aniline and Film Corp.) (dye) | 4.5 g. |
| Sudan Yellow GRN (General Aniline and Film Corp.) (dye) | 5.0 g. |
| Acetosol Orange RLS (Sandoz, Inc.) (dye) | 3.0 g. |
| Nonylphenoxypoly(ethyleneoxy)ethanol surfactant (Igepal CO-630, a trademarked product of General Aniline and Film Corp.) | 51.5 g. |
| Finely divided silica (Syloid 244, a trademarked product of W. R. Grace and Co.) | 2.0 g. |
| Ethyl acetate | 185 g. |
| Isobutyl alcohol | 280 g. |
| Ethyl alcohol | 535 g. |
| Dimethylformamide | 120 g. |

*Believed to be a copolymer of ethylmethacrylate and methylmethacrylate.

Solvent was removed by heat. The resulting laminate was dark red in color and was transparent. A triangular pattern was cut into the red polymeric film of the composite with a sharp razor blade, and the portion of the coating layer within the triangle was peeled from the film to provide a transparent, colorless triangular "window" in the laminate. No lifting or separation of the edges of the remaining polymeric film were noted. The removed portion of the film retained no noticeable static charge.

EXAMPLE II

Results similar to those of example I were obtained by coating onto a 0.003 inch thick sheet of polyethylene terephthalate to a dry thickness 0.0015 inches a coating solution having the following composition:

| | |
|---|---|
| Cellulose nitrate polymer | 40 g. |
| Amaplast Red OBJ (American Aniline Products, Inc.) (dye) | 1.2 g. |
| Sudan Yellow GGA (General Aniline and Film Corp.) (dye) | 1.0 g. |
| Polyoxyethylene monolaurate surfactant (Aldosperse L-9, a product of Glyco Chemicals, Inc.) | 60 g. |
| Finely divided silica (Syloid 244, a trademarked product of W. R. Grace and Co.) | 2.0 g. |
| n-Butanol | 100 ml. |
| Ethyl alcohol | 700 ml. |
| Diethyl ether | 200 ml. |

EXAMPLE III

Results similar to those of example I were obtained by coating onto a 0.003 inch thick sheet of polyethylene terephthalate to a dry thickness of 0.0015 inches a coating solution having the following composition:

| | |
|---|---|
| Cellulose propionate (PLFS-70, a product of Celanese Corp.) | 35 g. |
| Sudan Orange RRA dye (a product of General Aniline and Film Corp.) | 0.4 g. |
| Sudan Red BBA dye (a product of General Aniline and Film Corp.) | 0.4 g. |
| Octylphenoxy poly(oxyethylene)ethanol surfactant (Triton X-100, a trademarked product of Rohm and Hass, Co.) | 10 ml. |

| | |
|---|---|
| Finely divided silica (Syloid 244, a trademarked product of W. R. Grace and Co.) | 0.5 g. |
| Acetone | 200 ml. |
| Methyl isobutyl ketone | 50 ml. |

EXAMPLE IV

Results similar to those of example I were obtained by coating onto a 0.003 inch thick sheet of polyethylene terephthalate to a dry thickness 0.0015 inches a coating solution having the following composition:

| | |
|---|---|
| Polyvinylbutyrate (Butvar B-72, a trademarked product of Monsanto Chem. Co.) | 15 g. |
| Azosol Fast Brilliant Red B (General Aniline and Film Corp.) (dye) | 0.4 g. |
| Celliton Fast Yellow 7GA dye (General Aniline and Film Corp.) | 0.4 g. |
| Polyoxyethylene monotallate surfactant (pegosperse 400 MOT, a product of Glyco Chem. Inc.) | 6.0 g. |
| Ethyl alcohol | 75 g. |
| Methyl ethyl ketone | 25 g. |

EXAMPLE V

An adhesive solution of

| | |
|---|---|
| Pale Natural Crepe Rubber | 10 g. |
| Xylene | 90 g. |
| Piccolyte 25 (a trademarked product of Pennsylvania Industrial Chemical Corp.) | 5 g. |
| Toluene | 95 g. | was applied to the surface of a 0.003 inch thick polyethylene terephthalate sheet to give a dry coating weight of 0.2 grams per square foot. Over the dried adhesive layer was then coated the solution of example I to provide a dry flexible polymeric film 0.0015 inches in thickness. Upon drying, the laminate was dark red in color and was transparent. A circular design was cut into the polymeric film and the underlying adhesive layer with a sharp razor blade, and the circular portion of the coating and adhesive was removed and was affixed by the adhesive to an aluminum plate as a machining pattern so that the plate could be machined into a circular disk having the dimensions of the original circular design.

EXAMPLES VI-IX

Example I was repeated for each of the following Examples except that the Igepal CO-630 surfactant was replaced by an equal amount of nonionic surfactant selected from the following table III. In each Example, results similar to those of example I were obtained.

TABLE III

| Example No. | Surfactant | Trade name |
|---|---|---|
| VI | Polyoxyethylene lauryl ether. | Atlas B.R.I.J.-30 (Atlas Chemical Industries, Inc.). |
| VII | Polyoxyethylene stearyl ether. | Atlas B.R.I.J.-76 (Atlas Chemical Industries, Inc.). |
| VIII | Tridecyloxy polyoxyethylene. | Emulphogene BC-610 (General Aniline and Film Corp.). |
| IX | Polyoxyethylene tert. dodecylthio- ether. | Nonic 218 (Pennsalt Chemicals Corp.). |

What is claimed is:

1. A unitary laminate comprising a backing layer and a flexible polymeric film carried by the backing layer and dry-strippable therefrom, said polymeric film comprising a plasticizable polymer, a separate radiation absorber, and a plasticizer compatible with said polymer, a major portion of said plasticizer by weight consisting essentially of a nonionic surfactant having in its hydrophilic moiety at least four consecutive, recurring oxyethylene units.

2. The laminate of claim 1 wherein said nonionic surfactant is the sole plasticizer in said polymeric film.

3. The laminate of claim 1 wherein said separate radiation absorber is at least one light-absorbing material.

4. A unitary laminate comprising a backing layer and a flexible polymeric film carried by the backing layer and dry-strippable therefrom; said polymeric film comprising at least one polymer selected from the group consisting of polyvinyl butyrate, polyvinyl alcohol, polymethyl methacrylate/n-butyl methacrylate copolymer, poly methylmethacrylate/ethylmethacrylate copolymer, cellulose acetate, cellulose acetate butyrate, cellulose propionate and cellulose nitrate; a separate radiation absorber; and a plasticizer compatible with said at least one polymer; a major portion of which plasticizer consists essentially of a nonionic surfactant having in its hydrophilic moiety at least four consecutive, recurring oxyethylene units.

5. The laminate of claim 4 wherein said nonionic surfactant is the sole plasticizer in said film.

6. A unitary laminate comprising a backing layer and a flexible polymeric film carried by the backing layer and dry-strippable therefrom; said polymeric layer comprising at least one separate light-absorbing material, and cellulose acetate butyrate polymer plasticized with a nonionic surfactant having polyoxyalkylene units solely in its hydrophilic moiety, at least four of which units are consecutive, recurring oxyethylene units.

7. A unitary laminate comprising a backing layer; a flexible polymeric film comprising a plasticizable polymer, a separate radiation absorber, and a plasticizer compatible with said polymer, a major portion of which plasticizer consists essentially of a nonionic surfactant having in its hydrophilic moiety at least four consecutive, recurring oxyethylene units; and an adhesive layer strippingly adherring said film to said backing layer, said adhesive layer having greater internal cohesive strength than adhesive strength to said backing layer and having sufficient adhesion to said polymeric film to remain adhered thereto when said film is stripped from said backing layer.

8. The laminate of claim 7 wherein said nonionic surfactant is the sole plasticizer in said polymeric film.

9. The laminate of claim 7 wherein said radiation absorber is at least one light-absorbing material.

10. A unitary laminate comprising a transparent backing layer; a flexible polymeric film comprising cellulose acetate butyrate polymer, at least one separate light-absorbing material, and sufficient plasticizer to plasticize said polymeric film said plasticizer consisting essentially of a nonionic surfactant having polyoxyalkylene units solely in its hydrophilic moiety, at least four of which units are consecutive, recurring oxyethylene units; and a pressure-sensitive adhesive layer strippingly adherring said polymeric film to said backing layer, said adhesive having greater cohesive strength than adhesive strength to said backing layer and having sufficient adhesion to said flexible polymeric film to remain adhered thereto when said polymeric film is stripped from said backing layer.

11. The laminate of claim 10 wherein said backing layer is polyethylene terephthalate, and wherein said nonionic surfactant is nonylphenoxypoly(ethyleneoxy)ethanol.

12. A unitary laminate comprising a backing layer and a flexible polymeric film carried by the backing layer and dry-strippable therefrom, said polymeric film comprising a plasticizable polymer, a separate radiation absorber, and a plasticizer compatible with said polymer, a major portion of said plasticizer by weight consisting essentially of a nonionic surfactant of the formula

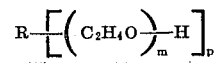

wherein $m$ is an integer greater than 3, $p$ is 1 or 2, and R is a p-valent derivative of a hydrophobic compound having at least one active hydrogen atom.

13. A unitary laminate comprising a backing layer and a flexible, plasticized polymeric film carried by said backing layer and dry-strippable therefrom, said film containing a separate radiation absorber and a plasticizer of which the major portion by weight consists essentially of a nonionic surfactant of the formula

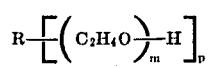

wherein $m$ is an integer greater than 3, $p$ is 1 or 2, and R is a p-valent derivative of a hydrophobic compound having at least one active hydrogen atom.

14. The unitary laminate of claim 13 wherein R is a derivative of an alkyl phenol, a fatty acid, a fatty alcohol, a fatty mercaptan, a fatty amine, a fatty amide, or a fatty polyol.

15. The unitary laminate of claim 13 wherein R is aromatic.

* * * * *

UNITED STATES PATENT OFFICE
CERTIFICATE OF CORRECTION

Patent No. 3,619,335　　　　　　　　Dated November 9, 1971

Inventor(s) Thomas Toplica Bryan

It is certified that error appears in the above-identified patent and that said Letters Patent are hereby corrected as shown below:

Column 3, line 33, after "cloudiness", insert --due to phase separation. A small amount of haziness or cloudiness--.

Signed and sealed this 5th day of December 1972.

(SEAL)
Attest:

EDWARD M. FLETCHER, JR.　　　　　　　ROBERT GOTTSCHALK
Attesting Officer　　　　　　　　　　Commissioner of Patents